(12) United States Patent
Poss et al.

(10) Patent No.: US 8,611,036 B2
(45) Date of Patent: Dec. 17, 2013

(54) DISK DRIVE WITH HEAD THERMAL FLY-HEIGHT ACTUATOR AND CONTROLLER FOR COMPENSATION OF WRITE HEAD EXPANSION

(75) Inventors: Joey Martin Poss, Rochester, MN (US); Craig K. Yanagisawa, Palo Alto, CA (US)

(73) Assignee: HGST Netherlands B.V., Amsterdam (NL)

( * ) Notice: Subject to any disclaimer, the term of this patent is extended or adjusted under 35 U.S.C. 154(b) by 54 days.

(21) Appl. No.: 13/465,008

(22) Filed: May 6, 2012

(65) Prior Publication Data
US 2013/0293984 A1 Nov. 7, 2013

(51) Int. Cl.
*G11B 21/02* (2006.01)

(52) U.S. Cl.
USPC .......................................................... 360/75

(58) Field of Classification Search
USPC .......................................... 360/69, 75, 59, 31
See application file for complete search history.

(56) References Cited

U.S. PATENT DOCUMENTS

| | | | |
|---|---|---|---|
| 5,991,113 A | 11/1999 | Meyer et al. | |
| 7,023,647 B2 | 4/2006 | Bloodworth et al. | |
| 7,215,495 B1 * | 5/2007 | Che et al. | 360/75 |
| 7,375,914 B1 | 5/2008 | Dieron et al. | |
| 7,457,072 B2 | 11/2008 | Dieron et al. | |
| 2005/0024775 A1 | 2/2005 | Kurita et al. | |
| 2005/0057841 A1 * | 3/2005 | Stover et al. | 360/59 |
| 2005/0105204 A1 * | 5/2005 | Bloodworth et al. | 360/75 |
| 2006/0268445 A1 * | 11/2006 | Brannon et al. | 360/75 |
| 2007/0064332 A1 | 3/2007 | Higashiya | |
| 2007/0217051 A1 * | 9/2007 | Shen et al. | 360/75 |
| 2008/0130159 A1 * | 6/2008 | Dieron et al. | 360/75 |
| 2009/0296260 A1 | 12/2009 | Maeda et al. | |
| 2012/0099218 A1 * | 4/2012 | Kurita et al. | 360/59 |

* cited by examiner

*Primary Examiner* — Thang Tran
(74) *Attorney, Agent, or Firm* — Thomas R. Berthold (57) ABSTRACT

The invention is a disk drive with a thermal fly-height actuator and a fly-height controller that compensates for exponential write pole protrusion during a write operation. The fly-height controller includes fly-height control logic that controls a single digital-to-analog converter (DAC) that outputs a voltage to drive the heater. Prior to writing, the heater is at the heater power value (HPV) required to maintain the read head at the desired fly-height (Read-HPV). At the initiation of writing the fly-height control logic inputs a new HPV to the DAC to reduce the heater power to begin the compensation. A new and successively reduced HPV is input to the DAC for each servo-identification (SID) mark, during which writing is prevented. When the DAC output voltage approaches the voltage corresponding to the desired write-head fly-height, the method is done.

9 Claims, 6 Drawing Sheets

DISK DRIVE WITH HEAD THERMAL FLY-HEIGHT ACTUATOR AND CONTROLLER FOR COMPENSATION OF WRITE HEAD EXPANSION

BACKGROUND OF THE INVENTION

1. Field of the Invention

This invention relates to magnetic recording disk drives, and more particularly to disk drives that have a thermal fly-height actuator for controlling the spacing between the read/write head and the disk.

2. Description of the Related Art

Magnetic recording hard disk drives use a read/write transducer or head mounted on a head carrier for reading and/or writing data to the disk. The head carrier is typically an air-bearing slider attached to an actuator arm by a suspension and positioned very close to the disk surface by the suspension. There are typically a stack of disks in the disk drive with a slider-suspension assembly associated with each disk surface in the stack.

The separation or spacing between the head and the disk surface is called the fly-height. The slider has a disk-facing air-bearing surface (ABS) that causes the slider to ride on a cushion or bearing of air generated by rotation of the disk. The slider is attached to a flexure on the suspension and the suspension includes a load beam that applies a load force to the slider to counteract the air-bearing force while permitting the slider to "pitch" and "roll". The flying dynamics of the slider and thus the fly-height are influenced by factors such as the rotation speed of the disk, the aerodynamic shape of the slider's ABS, the load force applied to the slider by the suspension, and the pitch and roll torques applied to the slider by the suspension.

Disk drives may use a fly-height actuator for changing the spacing between the head and the disk surface. One type of fly-height actuator is a thermal actuator with an electrically-resistive heater located on the slider near the head. When current is applied to the heater the heater expands and causes the head to expand and thus move closer to the disk surface. Disk drives with thermal fly-height actuators typically adjust the fly-height to different heights, depending on whether the drive is reading or writing. Also, the fly-heights may be adjusted depending on the radial location, i.e., the data track, where the head is reading or writing data. Thus there are typically a set of different heater power values that can be applied, depending on the head selected and the band where data is read or written.

However, even in the absence of heat to the heater, the write head expands during a write operation as a result of heat from the write coil, which results in protrusion of the write head pole. Thus the fly-height of the write head decreases exponentially during a write operation. To compensate for this, the heater power can be adjusted (decreased) to increase the fly-height. However, if the nominal fly-height cannot be maintained data errors can occur during writing or the write head can fly too close to the disk, causing premature mechanical head wear.

What is needed is a disk drive with a thermal fly-height actuator and a controller that accurately compensates for write head expansion during writing.

SUMMARY OF THE INVENTION

The invention is a disk drive with a thermal fly-height actuator and a fly-height controller that compensates for exponential write pole protrusion during a write operation. The fly-height controller includes fly-height control logic that controls a single digital-to-analog converter (DAC) that outputs a voltage to drive the heater on the slider. Prior to writing, the heater is at the heater power value (HPV) required to maintain the read head at the desired fly-height (Read-HPV). At the initiation of writing the write gate goes low and the fly-height control logic inputs a new HPV to the DAC to reduce the heater power to begin the compensation. A new and successively reduced HPV is input to the DAC for each servo-identification (SID) mark, which are angularly-spaced marks on the disk that signal the commencement of servo regions during which writing is prevented. Each new HPV is calculated according to the following:

$$HPV(n) = (\text{Write-HPV}) + [(\text{Read-HPV}) - (\text{Write-HPV})]\exp^{(-n/Tau)}$$

where Write-HPV is the HPV required to achieve a desired write head fly-height, Tau is the time constant that generally matches the time constant of the exponential rate of write pole fly-height reduction due to heating from the write coil, and n is a digital counter for counting the SIDs. The DAC thus outputs an output voltage DAC(n) for each input HPV(n). At the start of the write operation DAC(n) will change at the write gate going low, and each time the write gate toggles, corresponding to the occurrence of a SID during which the write head cannot write, the value of n is incremented by 1. The method continues by incrementing n with each write gate toggle. When the DAC(n) output voltage approaches the voltage corresponding to the desired write-head fly-height, the method is done. The value of Tau is selected to match the exponential behavior of the write pole due to write coil heating.

For a fuller understanding of the nature and advantages of the invention, reference should be made to the following detailed description taken together with the accompanying figures.

DETAILED DESCRIPTION OF THE INVENTION

Figure 1:
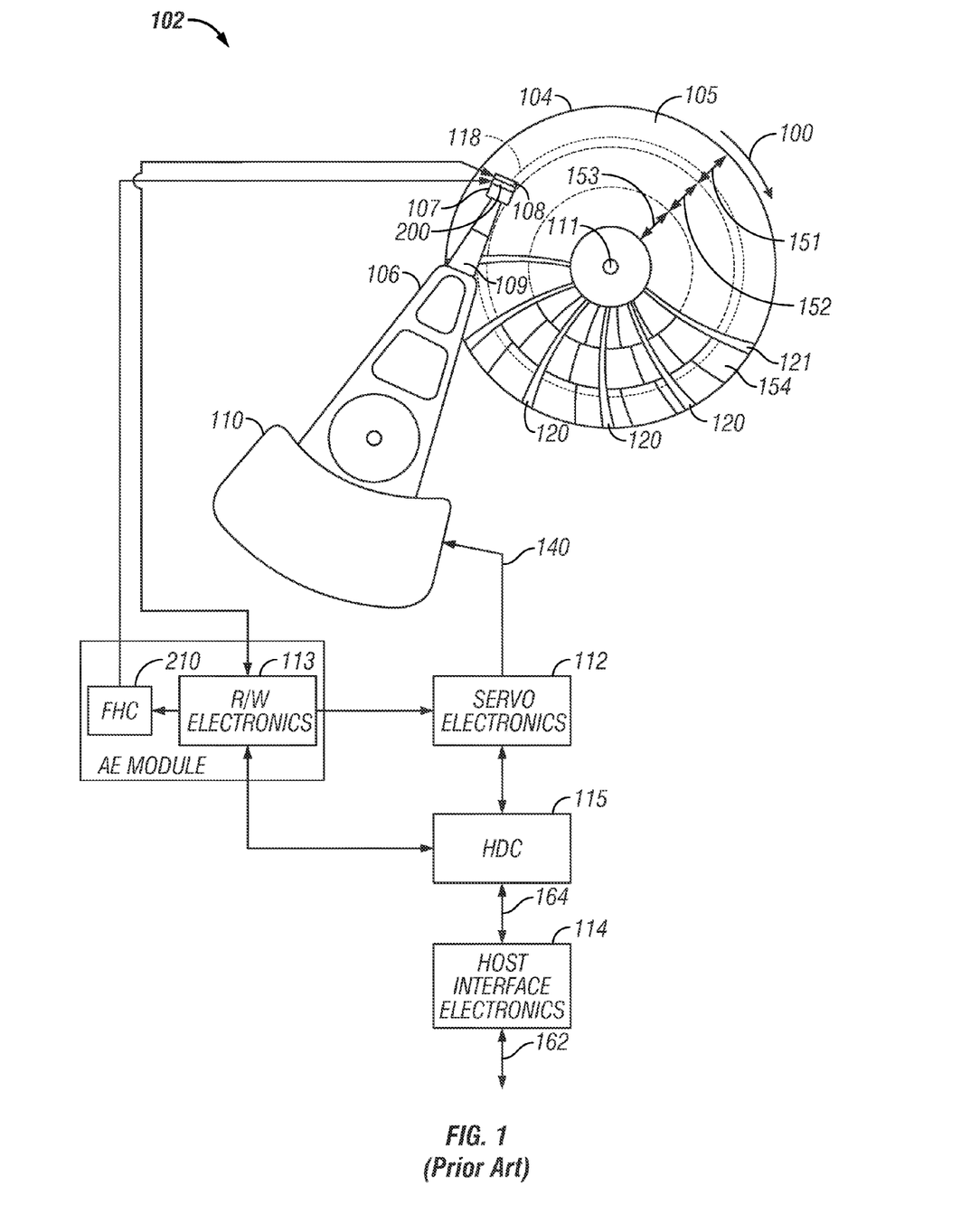
FIG. 1 is a schematic block diagram of a conventional magnetic recording disk drive of the type usable with this invention and having a fly-height actuator.

FIG. 1 is a block diagram of a conventional disk drive of the type usable with the present invention. The disk drive depicted is one that is formatted using a fixed-block "headerless" architecture with sector servo and zone-bit recording (ZBR), but the invention is applicable to disk drives using other types of data architectures and servo systems.

The disk drive, designated generally as 102, includes at least one data recording disk 104, a voice coil motor 110 actuator, an actuator arm 106, a suspension 109, a head carrier or slider 107, a data recording transducer 108 (also called a recording head or read/write head), servo electronics 112, read/write electronics 113, the hard disk controller (HDC) 115, and host interface electronics 114. The host interface electronics may be any conventional computer-HDD interface, such as Serial ATA (Advanced Technology Attachment) or SCSI (Small Computer System Interface). The recording head 108 may be an inductive write head with a magnetoresistive (MR) read head. The read/write 108 is typically located on a head carrier, such as an air-bearing slider 107 that has an air-bearing surface (ABS) facing the surface 105 of disk 104. The slider 107 is attached to the actuator arm 106 by a suspension 109 that allows the slider to "pitch" and "roll" with its ABS supported above but in close proximity to the surface 105 of rotating disk 104.

While only one head 108 and associated disk surface 105 are shown in FIG. 1, there are typically multiple disks stacked on a hub that is rotated by a disk motor, with a separate read/write head associated with each surface of each disk. Data recording disk 104 rotates in the direction of arrow 100 about a center of rotation 111, and is divided for head positioning purposes into a set of radially-spaced tracks, one of which is shown as track 118. The tracks are grouped radially into a number of zones or bands, three of which are shown as bands 151, 152 and 153. The 104 disk contains a plurality of servo sectors 120, which extend across the tracks in a generally radial direction. Each track has a reference index 121 indicating the start of track. Within each band, the tracks are also circumferentially divided into a number of data sectors 154 where user data is stored. In a "headerless" or "No-ID" data architecture, the data sectors contain no data sector identification (ID) fields for uniquely identifying the data sectors. If the disk drive has multiple heads, one head for each disk surface, as is typical, then the set of data tracks that are at the same radius on all disk data surfaces is referred to as a "cylinder".

Read/write electronics 113 receives signals from head 108, passes servo information from the servo sectors 120 to servo electronics 112, and passes data signals to the hard disk controller (HDC) 115. Servo electronics 112 uses the servo information to produce a current at 140 which drives voice coil motor 110 to position the head 108 to the desired data track and to maintain it on the data track during reading and writing. Host interface electronics 114 communicates with a host computer or system (not shown) over interface 162, passing data to the host. Interface electronics 114 also communicates with HDC 115 over interface 164, passing read and write commands to HDC 115.

In the operation of disk drive 102, interface electronics 114 receives a request from the host for reading data from or writing data to a selected data sector or sectors 154. HDC 115 receives a list of requested data sectors from interface electronics 114 and converts them into band, cylinder, head, and data sector numbers which uniquely identify the location of the desired data sectors. The head and cylinder information are passed to servo electronics 112, which is responsible for positioning the read/write head 108 over the appropriate data sector on the appropriate cylinder. If the cylinder number provided to servo electronics 112 is not the same as the cylinder number over which the head 108 is presently positioned, servo electronics 112 first executes a seek operation to reposition the head 108 to the appropriate cylinder.

Once servo electronics 112 has positioned head 108 over the appropriate cylinder, servo electronics 112 begins executing sector computations to locate and identify the desired data sector. As servo sectors 120 pass under head 108, the headerless architecture approach is used to identify each servo sector. In brief, a servo identification (SID) mark, also called a servo timing mark (STM), is used to locate servo sectors, and a count of SIDs from a servo sector containing an index mark 121 uniquely identifies each servo sector. Additional information is maintained in association with servo electronics 112 and HDC 115 for controlling the reading or writing of data in the data sectors.

Figure 2A:
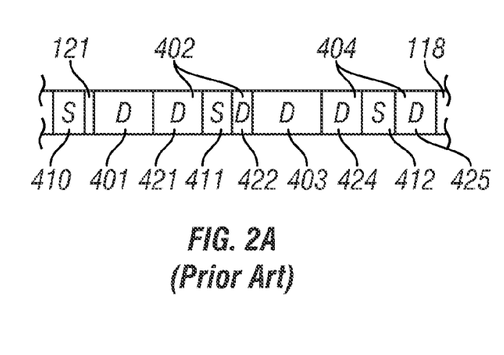
FIG. 2A is a portion of a typical data track showing four complete data sectors and three representative servo sectors.
Figure 2B:
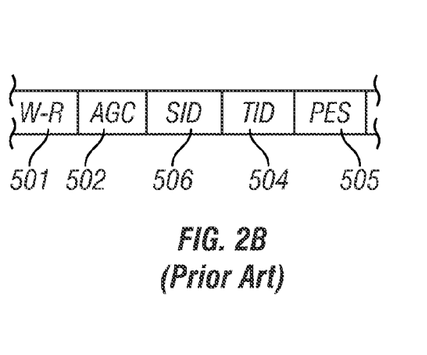
FIG. 2B is an expanded view of one of the servo sectors illustrated in FIG. 2A.

Referring now to FIG. 2A, a portion of a typical track 118 on the disk 104 is shown expanded. Four complete data sectors are shown (401, 402, 403 and 404). Three representative servo sectors 410, 411, and 412 are also shown. As can be seen from this example, some data sectors are split by servo sectors, and some data sectors do not start immediately following a servo sector. For example, data sectors 402 and 404 are split by servo sectors 411 and 412, respectively. Data sector 402 is split into data sections 421 and 422, and data sector 404 is split into data sections 424 and 425. Data sector 403 starts immediately after the end of data sector 402, rather than immediately following a servo sector. The index mark 121 indicates the beginning of the track and is shown contained in servo sector 410. FIG. 2B is an expanded view of one of the servo sectors illustrated in FIG. 2A. Typically, each servo sector is preceded by a write-to-read (W-R) gap 501 and automatic gain control (AGC) field 502 and contains a SID 506. The SID 506 serves as a timing reference for reading the subsequent servo information in track identification (TID) field 504 and position error signal (PES) field 505. The SID is sometimes also referred to as a servo address mark or servo start mark. The TID field 504 typically includes a servo sector number (SSN) for uniquely identifying the servo sector.

The disk drive shown in FIG. 1 also includes a thermal fly-height actuator 200 for changing the spacing between read/write head 108 and the surface of disk 104. Thermal fly-height actuator 200 is an electrically-resistive heater and located on slider 107 and controlled by a fly-height controller (FHC) 210. The FHC 210 and R/W electronics 113 may be implemented in a single chip referred to as the arm-electronics (AE) module, which is typically mounted on the rotatable block that supports the actuator arms, like arm 106.

Figure 3:
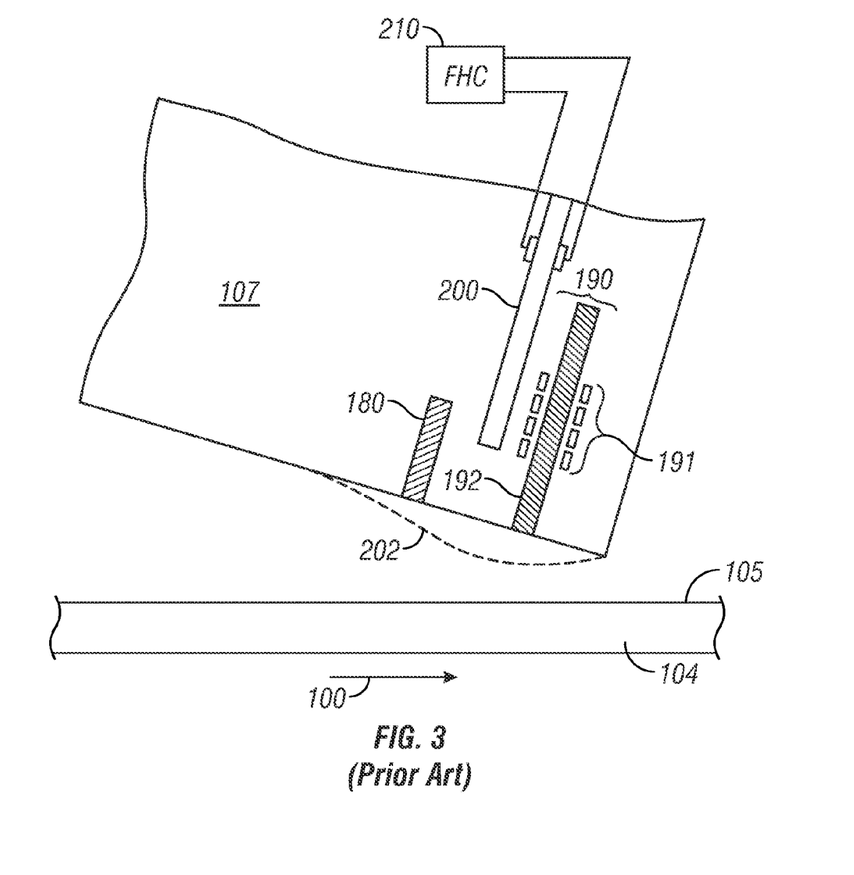
FIG. 3 is a sectional view of the end portion of an air-bearing slider above the surface of a disk and illustrates the thermal fly-height actuator, a read head and a write head on the slider.

FIG. 3 is a sectional view of the end portion of slider 107 above the surface 105 of disk 104 and shows the read/write head and thermal fly-height actuator 200. The rotation of the disk 104 in the direction of arrow 100 generates an air bearing between the ABS of slider 107 and disk surface 105. During operation of the disk drive, the air bearing counterbalances the slight spring force of the suspension 109 (FIG. 1) and supports the slider 107 off and slightly away from the disk surface 105 by a small, substantially constant spacing. The read/write head includes a MR read head 180 and write head 190. Write head 190 is depicted as a perpendicular magnetic recording inductive write head with coil 191 wrapped around write pole 192. The thermal fly-height actuator in FIG. 3 is an electrically-resistive heating element or heater 200 electrically connected to and controlled by FHC 210. FHC 210 is a power source that controls the amount of current to the heater 200. As the current increases, the heater 200 expands and causes protrusion (PTR) of the heads, as shown by the dashed line 202, which moves the MR read head 180 and write pole 192 of write head 190 closer to disk surface 105. A thermal fly-height actuator is described in U.S. Pat. No. 5,991,113 and published patent application US 2005/0024775 A1. U.S. Pat. No. 7,023,647 B2 describes a thermal actuator fly-height control circuit that may be implemented into the disk drive's MR head pre-amplifier circuit.

Figure 4A:
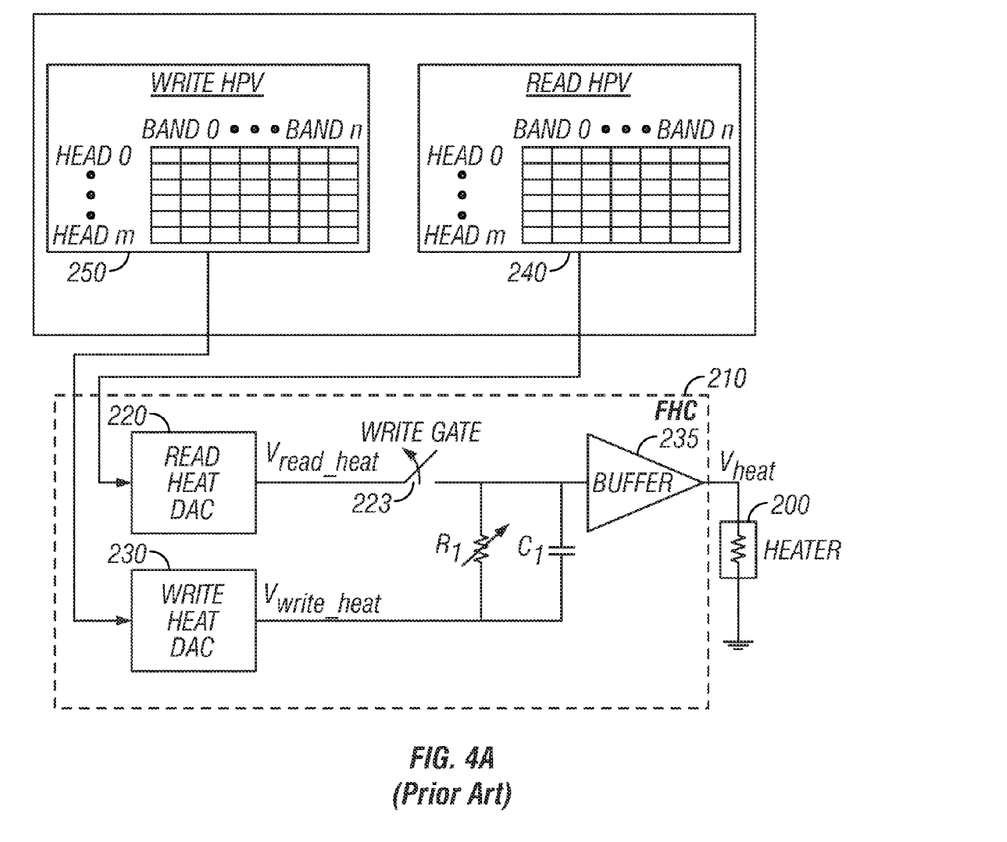
FIG. 4A is a high-level schematic of the fly-height controller according to the prior art.

FIG. 4A is a high-level schematic of the FHC 210. FHC 210 includes a read-heat digital-to-analog converter (DAC) 220 and a write-heat DAC 230 connected to a resistor (R1)-capacitor (C1) circuit and buffer 235. A read fly-height control signal register 240 and a write fly-height control signal register 250 which store sets of fly-height read and write control signal values to be used during reading and writing. Each control signal value for a specific head and band is called a heater power value (HPV), so register 240 stores a set of Read-HPVs to be used during reading and register 250 stores a set of fly-height Write-HPVs to be used during writing. The HPVs in registers 240, 250 are determined from measurements during the disk drive manufacturing process. Registers 240, 250 may be look-up tables in RAM or on the disk that store Read-HPVs and Write-HPVs, respectively, for each head and band, as shown in FIG. 4A for a disk drive with m heads (corresponding to m disk surfaces) and n bands.

During operation of the disk drive, the HDC 115 (FIG. 1) sends read and write commands to read/write electronics 113 to read or write data to a selected data track and sector or sectors. This information, specifically the head number, cylinder number and data sector number where data is to be read or written, is passed from read/write electronics 113 to FHC 210. The head number and the cylinder number (which identifies the band in which the selected data track is located), determines whether the command is to read or write, and the appropriate Read-HPV or Write-HPV is input to DAC 220 or DAC 230.

During reading, switch 223, which is controlled by the write gate signal from R/W electronics 113, is closed, so DAC 220 converts the Read-HPV to the appropriate read-heat voltage ($V_{read\_heat}$) and outputs it through buffer 235 to heater 200. The purpose of buffer 235 is to isolate the $V_{read\_heat}$ or $V_{write\_heat}$ DAC output from the $V_{heat}$ to the heater 200. The isolation is needed to have R1 and C1 see a high impedance so that the heater resistance does not affect the R1*C1 time constant. The output of the buffer 235 is low impedance to voltage-drive a wide range of heater resistance values. When the disk drive is reading or idle, power remains applied to heater 200 at the most recent value of $V_{read\_heat}$. When the read/write electronics 113 receives a write command the appropriate Write-HPV is recalled from register 250 and input to DAC 230. Switch 223 is then opened by the write gate going low and DAC 230 converts the Write-HPV to the appropriate write-heat voltage ($V_{write\_heat}$) and outputs it through buffer 235 to heater 200.

Figure 4B:
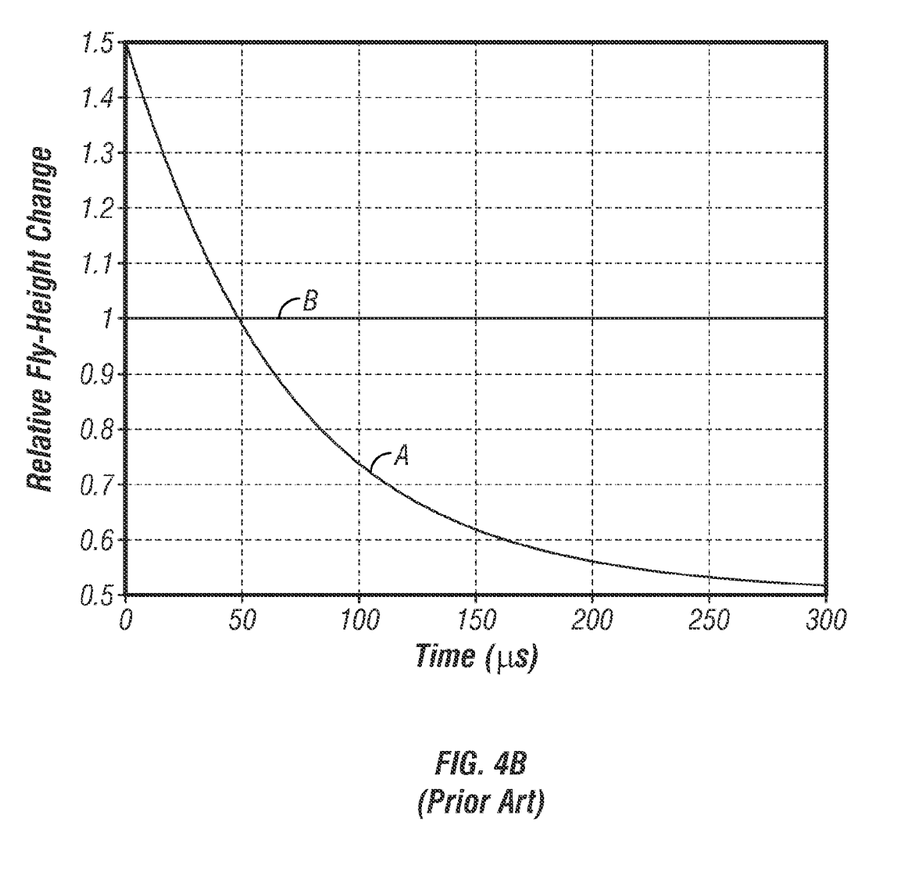
FIG. 4B is a graph showing the typical relative change in write head fly-height during a write operation due to heating from the write coil.

However, in this method of fly-height control, a problem arises at the commencement of a write operation. Referring again to FIG. 3, even in the absence of heat to heater 200, the write head 190 expands due to heat from the write coil 191, which results in protrusion of the write head pole 192. Because the heater 200 is already on to maintain the read head 180 at the desired read fly-height, the pole 192 can move too close to the disk, causing premature mechanical head wear. FIG. 4B is a graph showing the typical relative change in write head fly-height during a write operation (exponential curve A). At commencement of the write operation (t=0), heater power is at the read power level and the write head is at a fly-height of 1.5 units. The desired write head fly-height is 1.0 units (line B). However, the write head expansion due to heat from the write coil causes the write pole to move exponentially to about 0.5 units in about 300 µs.

Figure 4C:
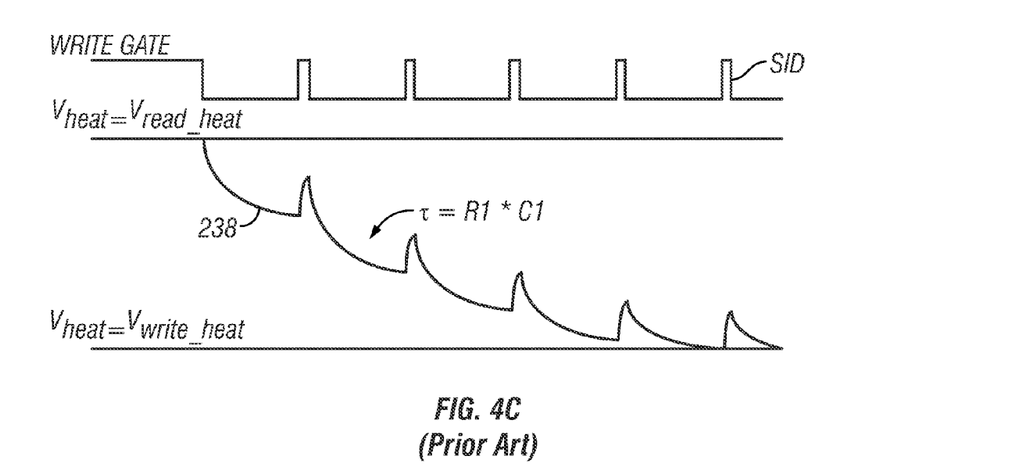
FIG. 4C illustrates the prior art method for compensating for the exponential write pole protrusion during a write operation.

FIG. 4C, together with FIG. 4A, illustrates the prior art method for compensating for this exponential write pole protrusion during a write operation. The fly-height is adjusted over time in an exponential manner to compensate for the exponential change in fly-height as the write head heats up. The FHC 210 uses a standard resistance and capacitance delay time constant (R1*C1) to reduce heat to the heater exponentially when the write operation begins. The resistance R1 is variable and C1 is relatively large to realize a large time constant. The two DACs 220, 230 drive the RC circuit. At the commencement of writing the write gate opens switch 223. This allows the voltage $V_{heat}$ to heater 200 to slew exponentially, based on the value of time constant R1*C1, from $V_{read\_heat}$ to $V_{write\_heat}$, as shown by curve 238. The peaks in curve 238 occur when the write head is over SIDs and the write head is prevented from writing and are due to $V_{read\_heat}$ being temporarily applied when the write gate is high during a SID. However, if the write-head fly-height decrease due to heat from the write coil does not accurately match the circuit exponential decay (curve 238) under all conditions, write-head fly-height error will occur. It is thus necessary to adjust the RC time constant to try to match the fly-height change due to heating from the write coil. However, silicon process changes and silicon temperature changes may cause the RC value to vary significantly. Making the RC circuit physically large with adjustability can reduce the tolerance variations, but requires more silicon area and an increase in cost.

Figure 5A:
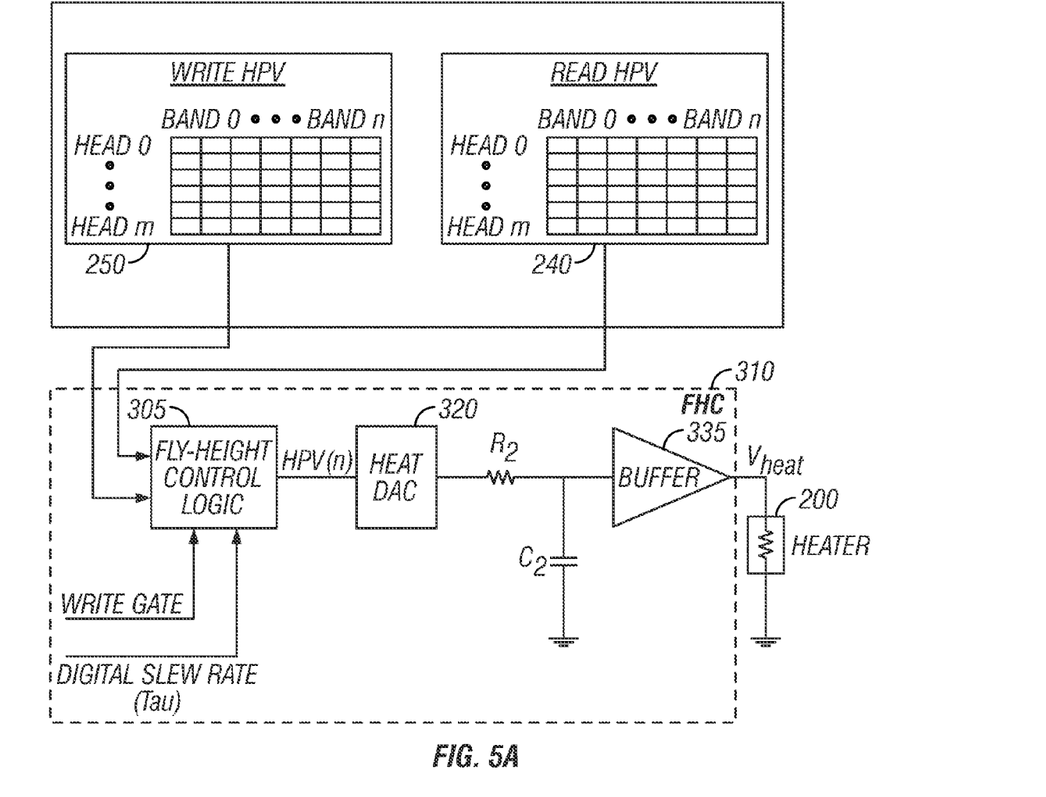
FIG. 5A is a high-level schematic of the fly-height controller according to this invention.
Figure 5B:
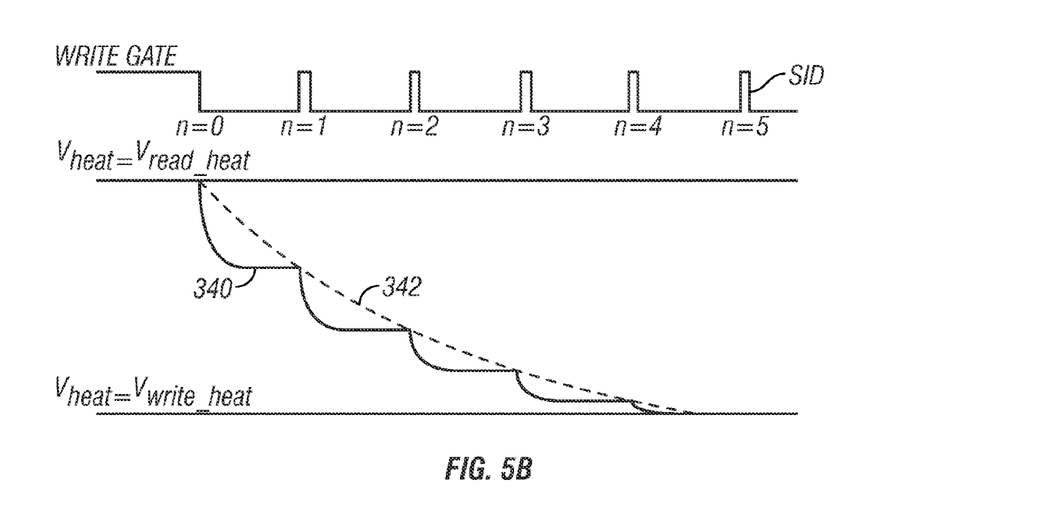
FIG. 5B illustrates the method of this invention for compensating for the exponential write pole protrusion during a write operation.

FIGS. 5A and 5B illustrate the fly-height controller and method of this invention for compensating for the exponential write pole protrusion during a write operation. The write-head fly-height change due to heating by the write coil is compensated in an efficient manner that reduces silicon area. The RC delay time constant of FIG. 4A is replaced with an exponential digital algorithm. The fly-height controller (FHC) 310 includes fly-height control logic 305 that controls a single DAC 320 that drives an RC circuit whose output is directed to buffer 335. The function of buffer 335 is the same as that for buffer 235 (FIG. 4A). The fly-height logic 305 changes the HPV input to DAC 320 at each step of the write gate at a digital slew rate determined by the fly-height logic control 305. The faster slew rate of the $V_{heat}$ signal is determined by R2*C2. The time constant of R2*C2 are not as critical as the prior art time constant R1*C1 (FIG. 4A). In the prior art, R1*C1 determined the overall time decay. In this invention, the fly-height control logic 305 determines the overall time decay. The value of R2*C2 is now only necessary to smooth the DAC switching noise. So R2*C2 acts as a filter to avoid noise coupling to the write head from the DAC switching. R2*C2 can be up to 10 times smaller than R1*C1, which reduces chip area. R2 can be variable.

After the write gate is opened (write gate low), a new HPV is calculated by logic 305 and input to DAC 320 at each occurrence of a SID. The following equation is used to realize the thermal fly-height control DAC 320 output:

$$V_{heat}(n) = V_{write\_heat} + (V_{read\_heat} - V_{write\_heat}) \exp(-n/Tau)$$  Equation (1)

where n is the number of the digital sample at each SID and Tau is the time constant in terms of SID to SID spacing time to match the time constant of the write head fly-height change due to the write coil heating. The HPV(n) value input to DAC 320 is calculated from the known value of Tau and the known values of Read-HPV and Write-HPV from registers 240, 250, respectively, corresponding to the desired values of $V_{read\_heat}$ and $V_{write\_heat}$, respectively. Thus:

$$HPV(n) = (Write\text{-}HPV) + [(Read\text{-}HPV) - (Write\text{-}HPV)] \exp(-n/Tau)$$  Equation (2)

At the start of the write operation DAC(n) will change at the first write gate going low. Each time the write gate toggles, corresponding to the occurrence of a SID during which the write head cannot write, the value of n is incremented by 1. The method continues by incrementing n with each write gate toggle. When DAC(n) output voltage approaches $V_{write\_heat}$, the method is done. Curve 340 shows the behavior of $V_{heat}$ between the DAC(n) outputs. Curve 342 represents the locus of digital V(n) values and is determined by the value of Tau, which is selected to match the exponential behavior of the write head due to write coil heating (FIG. 4B). There are a number of ways to realize the exponential function in logic to obtain the correct time decay of curve 342. At each rising edge of the write gate (the beginning of a SID), the fly-height control logic 305 calculates the next DAC(n) value to realize the overall time constant of curve 342. The "faster" slew rate, as shown by curve 340, between each write gate toggle, shows the decay due to the R2*C2 time constant. As described above, this slew rate value is less important and is used for DAC output filtering.

Figure 6:
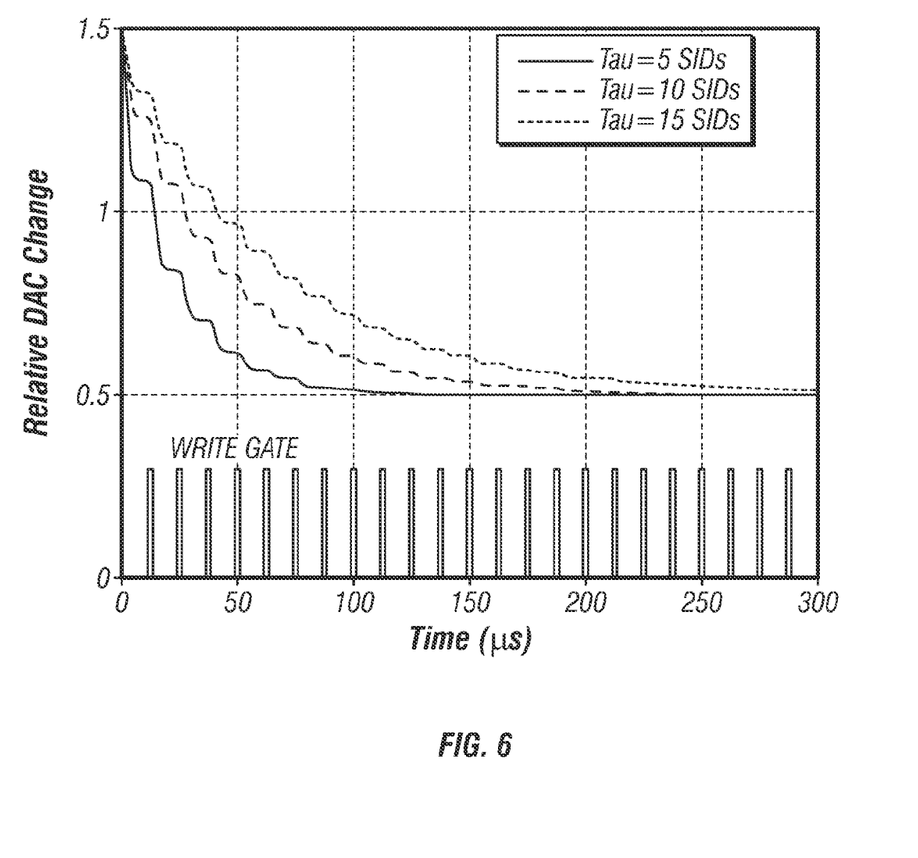
FIG. 6 shows the digital-to-analog converter (DAC) output over time with three different values of the digital slew rate (Tau) with the method of this invention.

FIG. 6 shows the DAC(n) output over time with three different Tau values of 5 SIDs, 10 SIDs and 15 SIDs. Tau is an adjustable parameter that is used to match the write element fly-height change due to write coil heating at the start of the write operation. Tau can be varied in fractional SID values. The Tau values are varied to find the closest match to the write element fly-height change due to write coil heating. Once the optimum Tau is determined, it can be represented as a digital number used in Equation (1) above.

The FHC 310 may be a microprocessor that runs a computer program that is stored in memory or combinatorial logic implemented in firmware or microcode. FHC logic 305 may be combinatorial logic that performs functions on the Read-HPV, Write-HPV and Tau input values to output the HPV(n) value to DAC 320. The memory for storing Read-HPV, Write-HPV and Tau values may be separate from the FHC logic 305 or as embedded memory on the HDC or AE modules.

While the invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk drive comprising:
   a rotatable magnetic recording disk having a plurality of generally concentric data tracks and a plurality of angularly-spaced servo sectors having servo identification (SID) marks extending generally radially across the tracks;
   an air-bearing slider maintained near the surface of the disk when the disk is rotating;
   a write head on the slider for writing data in the data tracks of the disk, the write head including an electrical coil for receipt of write current;
   a read head on the slider for reading data in the data tracks of the disk, the read head being capable of detecting SID marks during rotation of the disk;
   a heater on the slider for changing the spacing between the heads and the disk;
   a data controller coupled to the head for controlling the reading and writing of data;
   a head fly-height controller (FHC) coupled to the data controller and the heater for applying power to the heater to change the spacing, the FHC including a digital-to-analog converter (DAC) for converting a digital heater power value (HPV) to an analog output voltage to the heater, the FHC including logic for undertaking method acts of:
   during reading of data, inputting to the DAC a HPV corresponding to the desired read head fly-height (Read-HPV); and
   during writing, for each SID commencing with the SID at initiation of writing, inputting to the DAC a successively reduced HPV, wherein each HPV is a HPV reduced according to an exponential relationship; and
   terminating the inputting of HPVs when the desired write head fly-height is achieved.

2. The disk drive of claim 1 wherein during writing the write current causes a reduction of the spacing between the write head and the disk at an exponential rate and wherein the sequence of HPVs input to the DAC are reduced generally at said exponential rate.

3. The disk drive of claim 1 wherein inputting to the DAC a successively reduced HPV comprises calculating said reduced HPV from the Read-HPV, the HPV corresponding to the desired write head fly-height (Write-HPV) and the time constant of said exponential relationship.

4. The disk drive of claim 3 wherein said calculated HPV for each value of n, where n is a digital counter, is $$HPV(n) = (\text{Write-HPV}) + [(\text{Read-HPV}) - (\text{Write-HPV})]\exp^{(-n/Tau)}.$$

5. In a magnetic recording disk drive that includes a rotatable magnetic recording disk having a plurality of generally concentric data tracks and a plurality of angularly-spaced servo sectors having servo identification (SID) marks extending generally radially across the tracks, an air-bearing slider maintained near the surface of the disk when the disk is rotating, a write head on the slider for writing data in the data tracks of the disk and including an electrical coil for receipt of write current, a read head on the slider for reading data in the data tracks of the disk and capable of detecting SID marks during rotation of the disk, a heater on the slider for changing the fly-height between the heads and the disk, a head fly-height controller (FHC), a data controller coupled to the head for controlling the reading and writing of data, and a digital-to-analog converter (DAC) for converting a digital heater power value (HPV) to an analog output voltage to the heater; a method for controlling the fly-height of the write head comprising:
   determining the exponential function of the write head fly-height in response to the initiation of write current to the coil, said exponential function having a time constant Tau;
   during reading, inputting by the FHC to the DAC a HPV representative of the heat required to achieve a desired read head fly-height (Read-HPV);
   at each SID following the initiation of writing, inputting by the FHC to the DAC a new HPV determined from the Read-HPV, the HPV representative of the heat required to achieve a desired write head fly-height (Write-HPV) and Tau; and
   repeating said inputting a new HPV for subsequent SIDs until the DAC output generally equals the voltage required to achieve the desired write head fly-height.

6. The method of claim 5 wherein inputting to the DAC at each SID a new HPV comprises inputting a HPV determined from the relationship:

$$HPV(n) = (\text{Write-HPV}) + [(\text{Read-HPV}) - (\text{Write-HPV})]\exp^{(-n/Tau)},$$

where n is a digital counter incremented with each successive SID.

7. A magnetic recording disk drive comprising:

a rotatable magnetic recording disk having a plurality of generally concentric data tracks and a plurality of angularly-spaced servo sectors having servo identification (SID) marks extending generally radially across the tracks;

an air-bearing slider maintained near the surface of the disk when the disk is rotating;

a perpendicular write head on the slider for writing data in the data tracks of the disk and including a write pole and an electrical coil for receipt of write current, the write pole having a fly-height above the disk with a characteristic exponential behavior in response to write current to the coil;

a read head on the slider for reading data in the data tracks of the disk, the read head being capable of detecting SID marks during rotation of the disk;

a heater on the slider for changing the fly-height of the heads above the disk;

a data controller coupled to the head for controlling the reading and writing of data;

a digital-to-analog converter (DAC) for converting a digital heater power value (HPV) to an analog output voltage to the heater; and fly-height control logic means for generating a digital Read-HPV to the DAC prior to writing of data and a successively reduced HPV with each SID following the initiation of writing, wherein the successively reduced HPVs are reduced at an exponential rate generally equal to the rate of said write pole fly-height characteristic exponential behavior.

8. The disk drive of claim 7 wherein the logic means includes combinatorial logic for calculating successively reduced HPVs with each SID according to:

$$HPV(n) = (\text{Write-HPV}) + [(\text{Read-HPV}) - (\text{Write-HPV})] \exp^{(-n/Tau)}$$

where Write-HPV is the HPV corresponding to the desired write head fly-height, Tau is the time constant for the exponential rate of successive HPVs, and n is a digital counter corresponding to a count of the SIDs.

9. The disk drive of claim 7 wherein the time constant for the exponential rate of successive HPVs is Tau, and further comprising a resistor-capacitor (RC) circuit between the DAC output and the heater, wherein RC is less than Tau.

* * * * *